(12) United States Patent
Elbers-Schrichten et al.

(10) Patent No.: US 11,549,586 B2
(45) Date of Patent: Jan. 10, 2023

(54) SEALING ELEMENT FOR A DOCTOR BLADE CHAMBER

(71) Applicant: Windmöller & Hölscher KG, Lengerich (DE)

(72) Inventors: Alexander Elbers-Schrichten, Lengerich (DE); Jörg Prigge, Lengerich (DE); Andreas Ihme, Lengerich (DE); Thomas Benke, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 133 days.

(21) Appl. No.: 16/070,141

(22) PCT Filed: Jan. 13, 2017

(86) PCT No.: PCT/EP2017/050671
§ 371 (c)(1),
(2) Date: Jul. 13, 2018

(87) PCT Pub. No.: WO2017/121852
PCT Pub. Date: Jul. 20, 2017

(65) Prior Publication Data
US 2020/0032906 A1    Jan. 30, 2020

(30) Foreign Application Priority Data
Jan. 14, 2016 (EP) .................................... 16151331

(51) Int. Cl.
*F16J 15/16* (2006.01)
*B41F 31/02* (2006.01)
*F16J 15/32* (2016.01)

(52) U.S. Cl.
CPC ........... *F16J 15/162* (2013.01); *B41F 31/027* (2013.01); *F16J 15/164* (2013.01); *F16J 15/32* (2013.01)

(58) Field of Classification Search
CPC ...... B41F 31/027; B41F 9/068; B41F 9/1063; B41F 9/06; B41F 9/16; F16J 15/162; F16J 15/164
See application file for complete search history.

(56) References Cited

U.S. PATENT DOCUMENTS

| 4,513,662 A | 4/1985 | Schneider |
| 5,012,736 A * | 5/1991 | Van Kanegan ....... B41F 31/027 |
| | | 101/207 |

(Continued)

FOREIGN PATENT DOCUMENTS

| DE | 1961033 | 6/1971 |
| DE | 4447123 | 4/1996 |

(Continued)

OTHER PUBLICATIONS

International Searching Authority, Written Opinion—International Application No. PCT/EP2017/050671, dated Jan. 13, 2017, 5 pages (In German).

(Continued)

*Primary Examiner* — Jennifer Bahls
*Assistant Examiner* — Quang X Nguyen
(74) *Attorney, Agent, or Firm* — Sunstein LLP (57) ABSTRACT

The invention relates to a sealing element for an ink chamber of a rotary printing press, wherein the sealing element has a sealing surface that rests against a roller body during operation of the rotary printing press. In order to reduce wear on the sealing element, the sealing surface has at least one flow outlet opening, at which an overpressure of a fluid may be built up during operation of the rotary printing press, in such (Continued)

a way that the fluid between the sealing surface and roller body forms a sealing flow film.

9 Claims, 7 Drawing Sheets

(56) References Cited

U.S. PATENT DOCUMENTS

| | | | | |
|---|---|---|---|---|
| 5,184,556 | A * | 2/1993 | Schaeuble | B41F 31/027 101/207 |
| 6,431,066 | B1 * | 8/2002 | Perez | B41F 31/027 101/157 |
| 2009/0000499 | A1 * | 1/2009 | Boose | B41F 31/027 101/363 |

FOREIGN PATENT DOCUMENTS

| | | |
|---|---|---|
| EP | 0111141 | 6/1984 |
| WO | WO 2008/021090 | 2/2008 |

OTHER PUBLICATIONS

International Searching Authority, International Search Report—International Application No. PCT/EP2017/050671, dated Feb. 23, 2017, 3 pages.

International Preliminary Examining Authority, International Preliminary Report on Patentability—International Application No. PCT/EP2017/050671, dated Apr. 19, 2018, 12 pages.

International Preliminary Examining Authority (English Translation), International Preliminary Report on Patentability—International Application No. PCT/EP2017/050671, dated Apr. 19, 2018, 10 pages.

* cited by examiner

SEALING ELEMENT FOR A DOCTOR BLADE CHAMBER

This application is the U.S. National Phase entry of PCT/EP2017/050671, filed Jan. 13, 2017, which claims priority to EP 16151331.2, filed Jan. 14, 2016, each of which are herein incorporated by reference in their entirety.

The invention relates to a sealing element for an ink chamber of a rotary printing press.

An ink chamber according to the prior art is known for example from DE 197 34 910 A1, in which the doctor blade chamber of a flexographic printing press is described.

In flexographic printing presses, the printing ink is applied to the printing cylinder by means of an anilox roll, which in turn is inked by means of a doctor blade chamber. The anilox roll has on its surface a regular grid of flat cells which are filled with printing ink as the respective peripheral portion of the anilox roll moves through the ink-filled ink chamber of the doctor blade chamber. When unrolling on the printing cylinder, the printing ink thus picked up is delivered to the printing cylinder.

The ink chamber is part of the doctor blade chamber and is delimited in its longitudinal direction by two doctor blades, and at the end faces thereof by two sealing elements. Conventional sealing elements of this type usually consist of a resilient material, such as foam or felt. The material of this sealing element must meet various requirements. It must be ensured that the ink chamber is sealed reliably and permanently, but in addition, in view of the friction between the sealing element and the rotating anilox roller, it should have the highest possible abrasion resistance. Moreover, the material must be chemically and mechanically resistant to the printing inks and solvents used. The printing ink that comes into contact with the surface of the sealing element may lead to swelling and softening of the material and on the other hand may lead to embrittlement of the material after the ink dries.

In addition, the sealing element must have a suitable elasticity and rigidity. The more rigid the sealing element and the greater the force with which the sealing element is pressed against the anilox roller, the greater the sealing effect—but also the greater is the wear due to the friction of the anilox roll. Conversely, leakage may occur at various locations in a relatively soft sealing element, such as at the interface between the anilox roller and the sealing element or at the interface between the sealing element and the corresponding fitting in which the sealing element is retained. It should also be borne in mind that wear occurs on the doctor blades during operation of the printing press, as a result of which the geometry of the cross section to be sealed changes, for which the sealing element must also compensate.

In all cases described, there is ultimately a high degree of wear on the sealing element, so that the sealing element must be replaced regularly. This in turn has corresponding maintenance and downtime costs for the printing press.

The objective of the invention is therefore to reduce the wear on the sealing element of an ink chamber.

This objective is achieved by the features of the independent claims.

The sealing element according to the invention is a sealing element for an ink chamber of a rotary printing press, having a sealing surface that rests on a roller body during operation of the rotary printing press, wherein the sealing surface has at least one flow outlet opening, on which during operation of the rotary printing press, an overpressure of a fluid may be built up in such a way that the fluid between the sealing surface and roller body forms a sealing flow film.

The method according to the invention is a method for operating a rotary printing press with an ink chamber that is sealed during operation by at least one sealing element according to the invention that rests against a roller body, wherein in operation a connection between the flow outlet opening and a gaseous medium is produced and wherein in the fluid, an overpressure is established in such a way that the fluid between the sealing surface and roller body forms a sealing flow film.

The sealing element according to the invention is preferably used for the end-side seals of a doctor blade chamber of a flexographic printing press.

Surprisingly, numerous advantages may be achieved by means of the invention. First of all, in principle, the lifespan of the seal used may be increased and thus the number of maintenance intervals may be reduced. In addition, it is possible to prevent the seal from drying on the roller body when the roller is stationary. In addition, it was found that friction between the roller body and the sealing body is reduced, which leads to a lower power loss on the roller drives and thus to a corresponding energy savings. Finally, better operating characteristics with less noise are evident for the entire printing press.

The fluid may be a liquid and also may be a gas. For a gas, air may preferably be used. Alternatively, however, it is also possible to use a protective gas which is suitable for displacing the oxygen in the ambient air (for example nitrogen or N2), in order to prevent ink from drying on the sealing surface. For a liquid, preferably the solvent of the ink (for example, alcohol or water) may be used.

According to a preferred embodiment, it is provided that the fluid is enriched with at least one additional fluid that propagates in the flow film and increases the sealing effect. Thus, for example, it is conceivable to use air as the primary fluid, the air being enriched with atomized droplets of a liquid. The liquid used is preferably the solvent of the ink just printed, i.e. typically ethanol or water. Particularly preferably, a switching device is provided by means of which, in the event of an ink change, it is possible to switch over to the appropriate liquid that is to be atomized in the flowing gas.

In addition, it is also conceivable that the fluid may be enriched with solid particles. For example, PTFE particles may be introduced into the fluid (e.g. having a diameter of 0.5 μm). PTFE (polytetrafluoroethylene) is a linear polymer of carbon and fluorine with a very low coefficient of friction. The PTFE particles deposit on the sealing surface, enhancing both the sliding properties and the sealing properties of the sealing surface. In addition, it has been found that by this means, the sealing surface is virtually impregnated, so that fewer ink particles may attach to the sealing surface.

According to a preferred embodiment, it is provided that the sealing element has at least one material component having elastic properties. Suitable elastic material components may be, for example, materials such as foams, felts or synthetic rubbers (for example ethylene-propylene-diene rubber or EPDM or ethylene-propylene rubber or EPM). The compression hardness of the material is chosen in such a way that during operation, a suitable bias of the sealing surface relative to the roller body is induced.

Another variant is that the sealing element consists of a less compressible material having a higher compression hardness (for example Teflon or polyurethane) and the bias of the sealing surface relative to the roller body arises due to an additional apparatus, such as a mechanical, hydraulic or pneumatic spring.

Finally, it is also conceivable that the base body of the sealing element consists of an elastic material the compression hardness of which causes the bias of the sealing surface relative to the roller body. In addition, the sealing surface may be coated with a less compressible material of higher compression hardness to reduce wear at this location.

According to a further preferred embodiment, it is provided that the sealing element consists of a molded body which is surrounded by an elastic hose through which the fluid flows, wherein a part of the hose forms the sealing surface and has at least one flow outlet opening. After the doctor blade chamber has been turned on the anilox roller, the fluid flows through the hose, and the hose establishes a seal with the boundary surfaces like a bicycle tube when pumping a bicycle tire.

From the above explanations, it is clear that, if required, not only one, but a plurality of flow outlet openings may be provided along the sealing surface, in order to further increase the advantages of the invention.

According to a further preferred embodiment, it is provided that the overpressure of the fluid is provided by a pressure line to which a pressure gauge is connected, the measurements of which may be transferred to a monitoring apparatus. In this way, both an undesired pressure increase (for example, in the case of a clogged flow outlet opening) and an undesired pressure drop (e.g. due to leakages) may be detected. In this case, an undesired pressure increase is usually an indicator that the sealing element must be replaced. As soon as this is detected by the monitoring apparatus, the monitoring apparatus may thus issue a corresponding warning message to the operator of the printing press that the relevant sealing element must be replaced.

Further details and advantages of the invention will be described with reference to the accompanying drawings. The drawings show the following.

Figure 1:
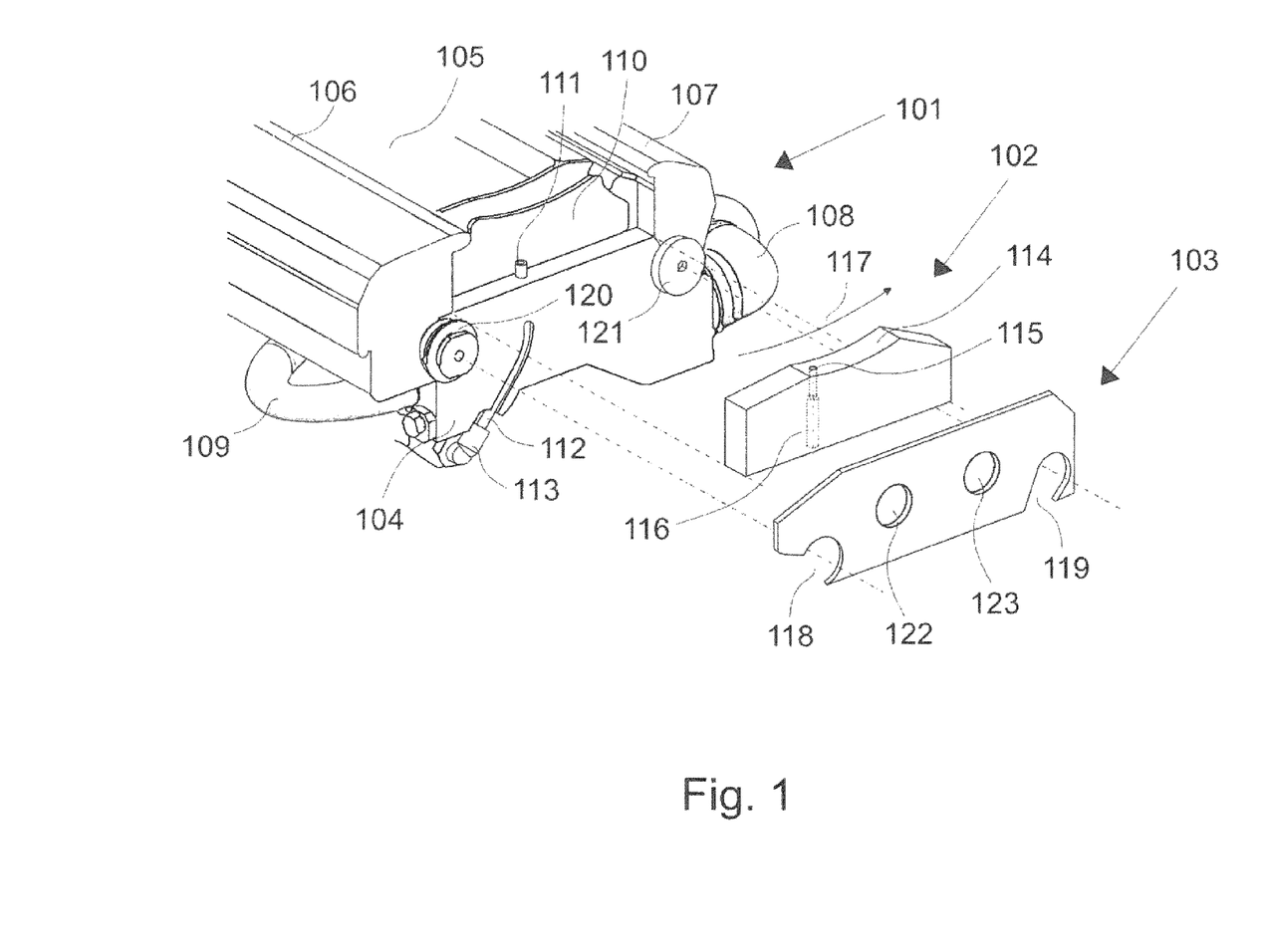
FIG. 1 shows a perspective view of the end face of a doctor blade chamber according to a first exemplary embodiment of the invention.

FIG. 1 shows a perspective view of the end face of a doctor blade chamber 101 with a sealing element 102 and an end plate 103, according to a first exemplary embodiment of the invention.

The doctor blade chamber 101 comprises a frame carrier 104 on which the ink chamber 105 is seated. On the longitudinal sides of the ink chamber, supporting rails 106, 107 are provided for attaching the doctor blade. The ink supply line 108 and the ink discharge line 109 for operating the ink circulation are located under the ink chamber 105.

Directly at the end face of the doctor blade chamber, a fitting 110 is furnished for the sealing element 102. A compressed air pin 111, which is supplied with compressed air via the compressed air line 112 and the compressed air connection 113, protrudes into the fitting 110.

The sealing surface 114 of the sealing element 102 has a compressed air outlet opening 115 that is connected to the underside of the sealing element 102 by a compressed air channel 116. The compressed air outlet opening 115 is arranged on the sealing surface 114 slightly laterally offset, because in operation a majority of the flow film is transported by the anilox roller in the direction of rotation 117, and only a smaller part of the flow film propagates counter to the direction of rotation 117. To take this circumstance into account, it is also possible to furnish a plurality of compressed air outlet openings 115.

The compressed air pin 111 has a larger diameter than the compressed air channel 116 within the sealing element 102, so that the compressed air channel 116 forms a seal around the compressed air pin 111 under normal pressure. But if for any reason too high a pressure arises in the compressed air line 112, then the elastic compressed air channel 116 acts as a pressure relief valve. Too high a pressure in the system may be caused for example by a clogging of the compressed air outlet opening 115. For monitoring the function of the entire sealing element 102, it is therefore also conceivable to connect a pressure gauge to the compressed air line 112, so that both an undesired pressure increase (e.g. due to a clogged compressed air outlet opening 115) and an undesirable pressure drop (e.g. due to leaks) may be recognized.

To start up the doctor blade chamber, the sealing element 102 is inserted into the fitting 110, so that the compressed air pin 111 protrudes into the compressed air channel 116. To secure the sealing element 102, the end plate 103 is fastened in front of the sealing element 102. For this purpose, recesses 118, 119 are provided on the end plate 103, which correspond to the clamp plates 120, 121 fastened to bolts in such a way that the end plate 103 may engage behind the clamping disks 120, 121. Grip holes 122, 123 are provided for better handling of the end plate 103.

After the doctor blades have also been mounted, the doctor blade chamber 101 is engaged against the anilox roller of the flexographic printing press and the ink circulation is started up. At the same time the compressed air line 112 is pressurized with compressed air, for example, with a pressure of 4 bar. Via the compressed air pin 111, the compressed air enters the compressed air channel 116 and exits at the compressed air outlet opening 115 at a pressure of about 1.8 bar. The thus released compressed air forms a flow film between the sealing surface 114 and the anilox roll surface, with which the above-described effects of the invention may be achieved. The flow outlet opening may, for example, have a diameter of 0.5 mm, through which an air flow of 2 liters/minute passes during operation. In consequence, even small amounts of air are sufficient to achieve the effects of the invention.

At the compressed air line 112, a pressure gauge, not shown in detail, is connected in order to monitor the air pressure. The measurements from the pressure gauge are transmitted to a monitoring apparatus so that the operator of the printing press may read off the measurements as needed. As soon as the pressure in the compressed air line 112 rises above a certain threshold, a warning message is issued by the monitoring apparatus. In general, this warning message means that the compressed air outlet opening 115 is clogged, and the sealing element 102 must be replaced.

Figure 2:
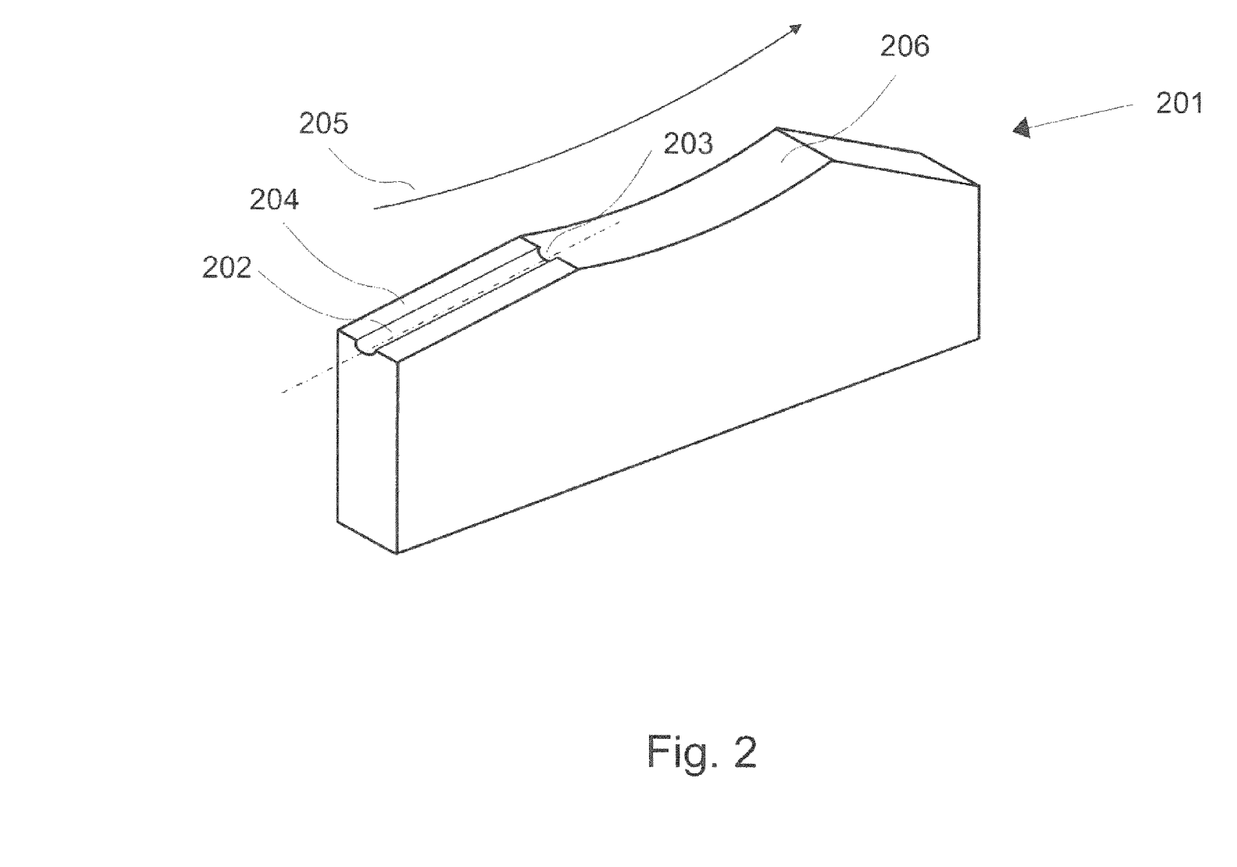
FIG. 2 shows a perspective view of a sealing element according to a second exemplary embodiment of the invention.

According to a second exemplary embodiment of the invention, FIG. 2 shows a perspective view of a sealing element 201. The sealing element 201 differs from the sealing element 102 according to FIG. 1 in that now an open compressed air channel 202 is provided that leads to the likewise open compressed air outlet opening 203. In operation, however, a doctor blade abuts the straight surface 204, so that the compressed air channel 202 and the compressed air outlet opening 203 are then closed. In a manner corresponding to the exemplary embodiment of FIG. 1, compressed air is then applied to the compressed air channel 202, so that the compressed air exits through the compressed air outlet opening 203 and is distributed in the direction of rotation 205 on the sealing surface 206 by the anilox roller. Overall, in this way the same effects of the invention as in the embodiment of FIG. 1 may be achieved. It is also possible to furnish both a compressed air channel 116 according to FIG. 1 and a compressed air channel 202 according to FIG. 2 on a sealing element.

Figure 3:
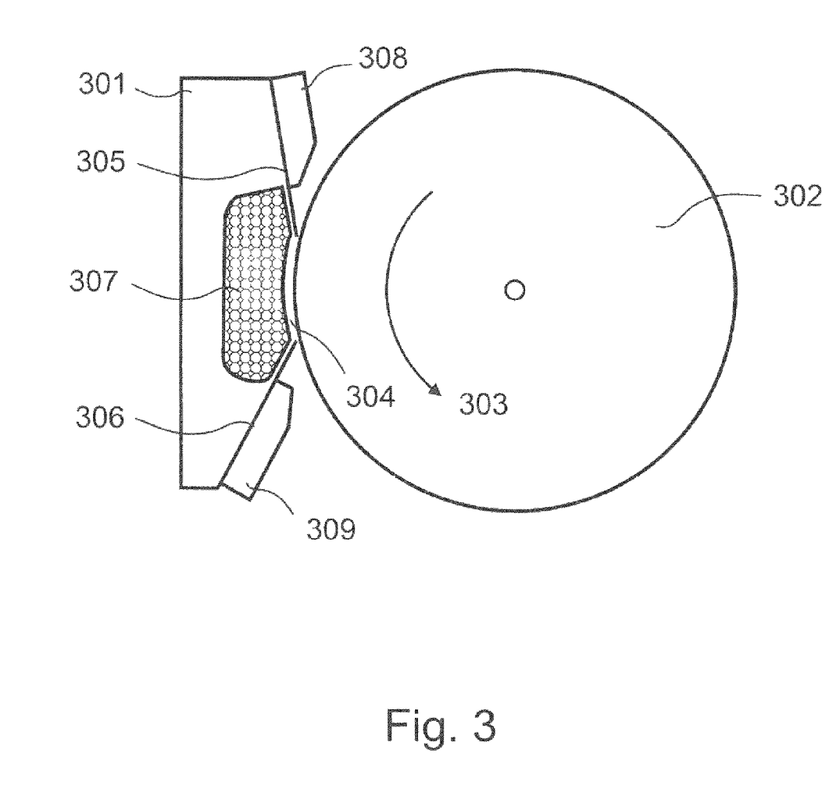
FIG. 3 shows a schematic side view of a doctor blade chamber according to a third exemplary embodiment of the invention.

According to a third exemplary embodiment of the invention, FIG. 3 shows a schematic side view of a doctor blade chamber 301 in the printing operating position, which is engaged with an anilox roller 302 of a flexographic printing press. The anilox roller 302 rotates in the direction of the arrow 303 during operation and picks up ink in the ink chamber 304. The ink chamber 304 is in turn bordered by the anilox roller 302, the closing doctor blade 305, the operating doctor blade 306 and on the end face by the respective sealing element 307. The closing doctor blade 305 and the working doctor blade 306 are fixed to the doctor blade chamber 301 by the supporting rails 308 and 309.

The sealing element 307 is made of a porous material such as microporous Teflon. A compressed air adapter not shown in detail is coupled to the sealing element 307 in such a way that compressed air exits the sealing surface in the area of the sealing element 307, so that a compressed-air flow film is formed between the sealing surface of the sealing element 307 and the surface of the anilox roller 302, and by this means in turn the above-described effects of the invention may be achieved.

Figure 4:
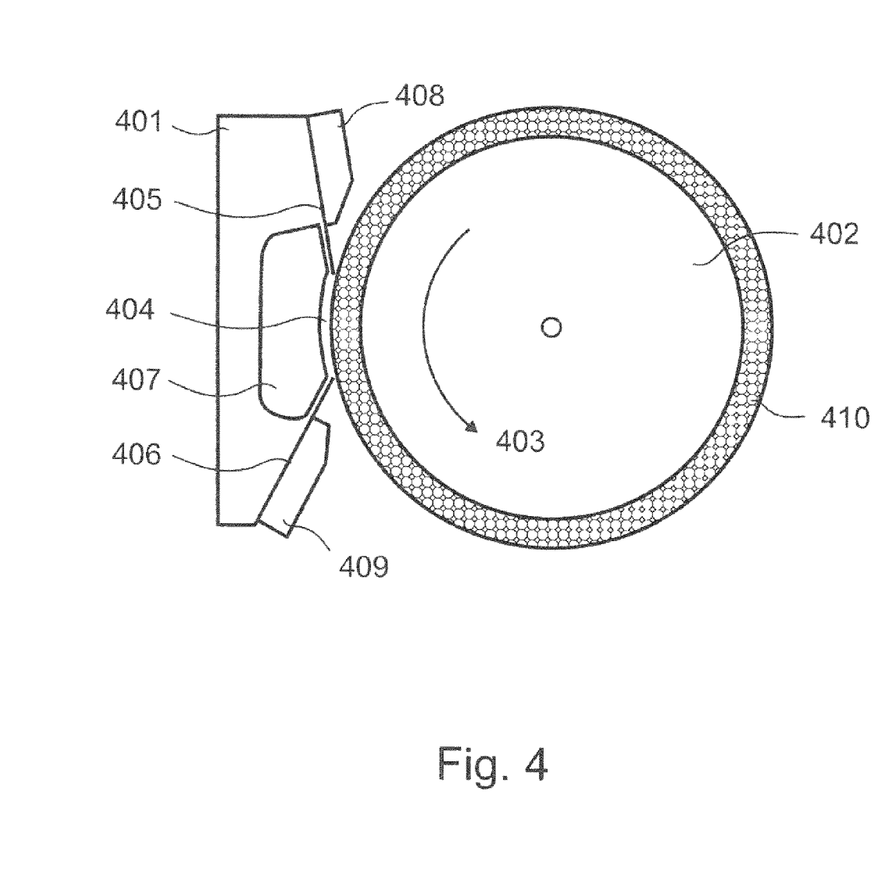
FIG. 4 shows a schematic side view of a doctor blade chamber according to a fourth exemplary embodiment of the invention.

According to a fourth exemplary embodiment of the invention, FIG. 4 shows a schematic side view of a doctor blade chamber 401 in the printing operating position, which is engaged with an anilox roller 402 of a flexographic printing press. The anilox roller 402 rotates in the direction of the arrow 403 during operation and picks up ink in the ink chamber 404. The ink chamber 404 is in turn bordered by the anilox roller 402, the closing doctor blade 405, the operating doctor blade 406 and on the end face by the respective sealing element 407. The closing doctor blade 405 and the working doctor blade 406 are fixed to the doctor blade chamber 401 by the supporting rails 408 and 409.

The anilox roller 402 has a porous surface 410 in the sectional plane, so that the fourth exemplary embodiment represents virtually a reversal of the principle of the third exemplary embodiment. Within the anilox roller 402, there is a compressed air adapter (not shown in detail) which is coupled to the porous surface in such a way that compressed air exits the porous surface 410 in the area of the sealing element 407, so that a compressed air flow film is formed between the sealing surface of the sealing element 407 and the porous surface 410, and by this means in turn the above-described effects of the invention may be achieved.

Figure 5:
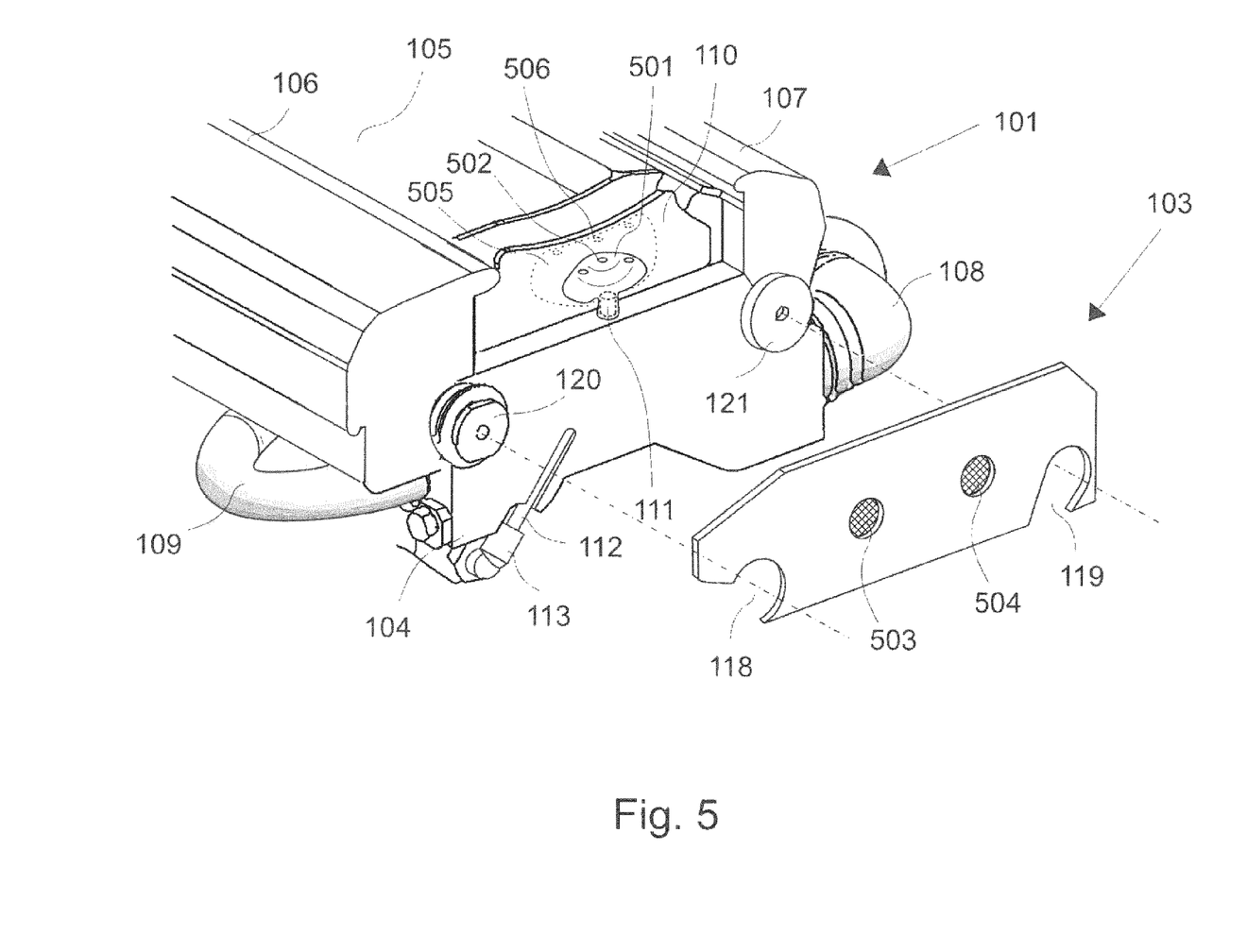
FIG. 5 shows a perspective view of the end face of a doctor blade chamber according to a fifth exemplary embodiment of the invention.

According to a fifth exemplary embodiment of the invention, FIG. 5 shows a perspective view of the end face of a doctor blade chamber. Relative to FIG. 1, like parts are assigned like reference numerals, so that in this respect reference may be made to the above description of FIG. 1. A decisive difference with respect to the first exemplary embodiment according to FIG. 1 and the fifth exemplary embodiment according to FIG. 5 is that, in place of the sealing element 102, a sealing balloon 501 is now furnished. The elastic material of the sealing balloon 501 must be chosen in such a way that it is sufficiently resistant both to the printing ink and to the fluid flowing through. A material resistant to both water and ethanol and printing ink would be, for example, EPDM (ethylene-propylene-diene rubber). Butyl rubber, which is known in the art and with which conventional bicycle tubes are manufactured (abbreviated IIR or isobutene-isoprene copolymer), however, is sufficiently resistant only to water and water-soluble inks and therefore is unsuitable for ethanol and ethanol-soluble inks.

The sealing balloon 501 is connected with the compressed air pin 111 in the fitting 110 so as to form a seal. On its upper side, the sealing balloon 501 has one or a plurality of compressed air outlet openings 502.

To start up the doctor blade chamber 101, the end plate 103 having recesses 118, 119 is fastened to the clamping disks 120, 121. The grip holes 503, 504 of the end plate 103 are provided with a mesh or the like on the side facing the doctor blade chamber 101 to prevent the sealing balloon 501 from bulging out of the grip holes 503, 504 in its inflated state. The doctor blade chamber 101 is then set against the anilox roller of the flexographic printing press, so that the fitting 110 is closed on all sides. Before the ink circulation is started up, the sealing balloon 501 is inflated to its final size within the fitting 110 so that the sealing balloon 501 forms a seal with the boundary surfaces of the fitting 110, similarly to a bicycle tube when inflating a bicycle tire. It thus creates a flexible seal, with which sealing problems may also be controlled that could not be achieved by the prior art, such as wear of the doctor blade or strong vibrations occurring during the printing process.

Dashed lines show the sealing balloon in a semi-inflated condition 505. It is clear that the compressed air outlet openings have now moved from their original position 502 to the position 506 and thus abut against the anilox roller to form the desired sealing surface.

To reduce the friction between the anilox roller and the sealing balloon 501 and at the same time increase the sealing effect, the surface of the sealing balloon may be coated in the manner already described. Additionally or alternatively, the fluid may be enriched in the manner already described with another fluid and/or with particles that propagate in the flow film and increase the sealing effect.

Figure 6:
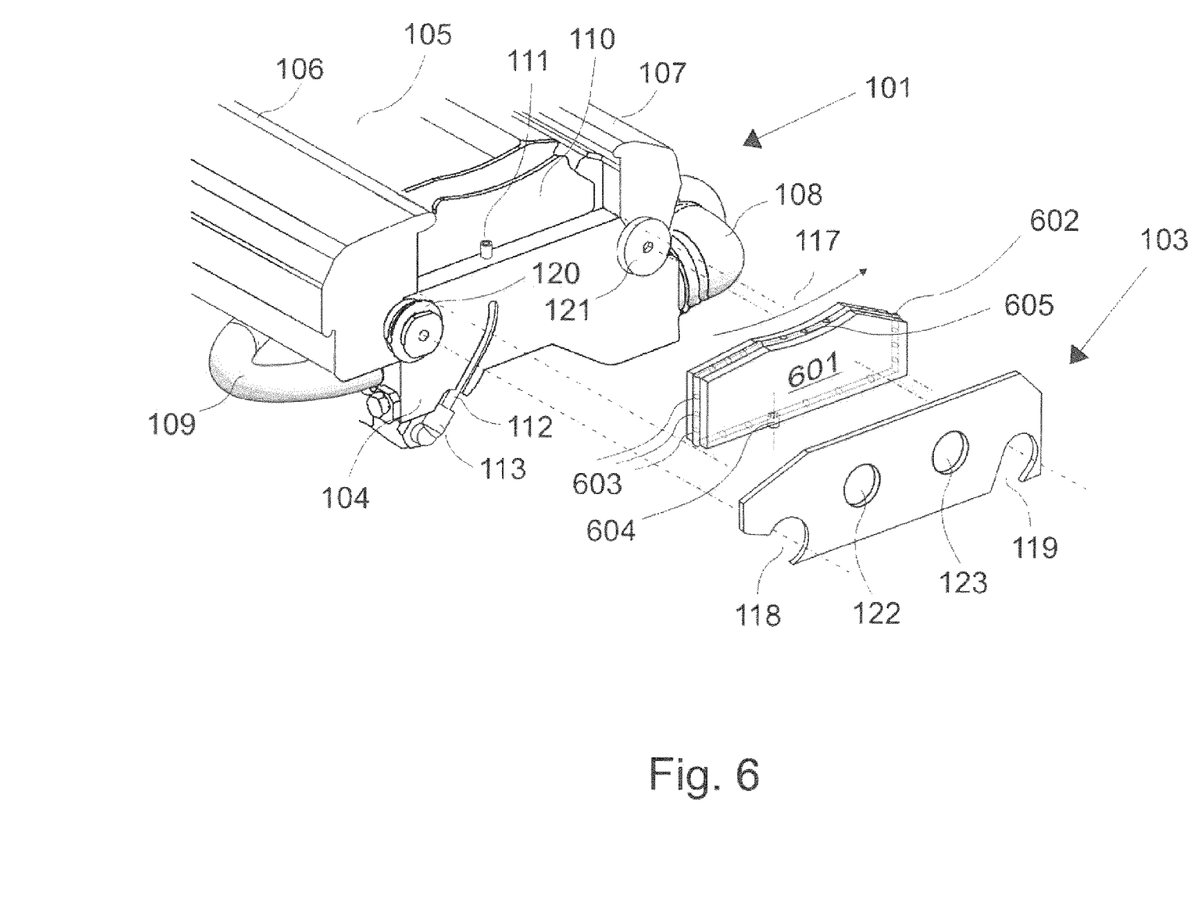
FIG. 6 shows a perspective view of the end face of a doctor blade chamber according to a sixth exemplary embodiment of the invention.

According to a sixth exemplary embodiment of the invention, FIG. 6 shows a perspective view of the end face of a doctor blade chamber. Relative to FIG. 1, like parts are assigned like reference numerals, so that in this respect reference may be made to the above description of FIG. 1. A decisive difference with respect to the first exemplary embodiment according to FIG. 1 and the sixth exemplary embodiment according to FIG. 6 is that, in place of the sealing element 102, a sealing mold 601 with a circulating hose 602 is now provided. The auxiliary lines 603 indicate the tubular shape along the circumference. The hose 602 has a connection nozzle 604 on the underside of the sealing mold 601, which may be slipped over the compressed air pin 111 to form a seal. In addition, the hose 602 has one or a plurality of compressed air outlet openings at the top side of the sealing mold 601.

The startup of the doctor blade chamber 101 is analogous to the fifth exemplary embodiment: First, the end plate 103 having recesses 118, 119 is attached to the clamping disks 120, 121. The doctor blade chamber 101 is then set against the anilox roller of the flexographic printing press, so that the fitting 110 is closed on all sides. Before the ink circulation is now started up, the hose 602 within the fitting 110 is inflated to its final size so that the hose 602 forms a seal with the boundary surfaces of the fitting 110, similarly to a bicycle tube when inflating a bicycle tire. The compressed air outlet openings 605 lie against the anilox roller and thus form the desired sealing surface. It thus creates a flexible seal, with which sealing problems may also be controlled that could not be achieved by the prior art, such as wear of the doctor blade or strong vibrations occurring during the printing process.

Figure 7:
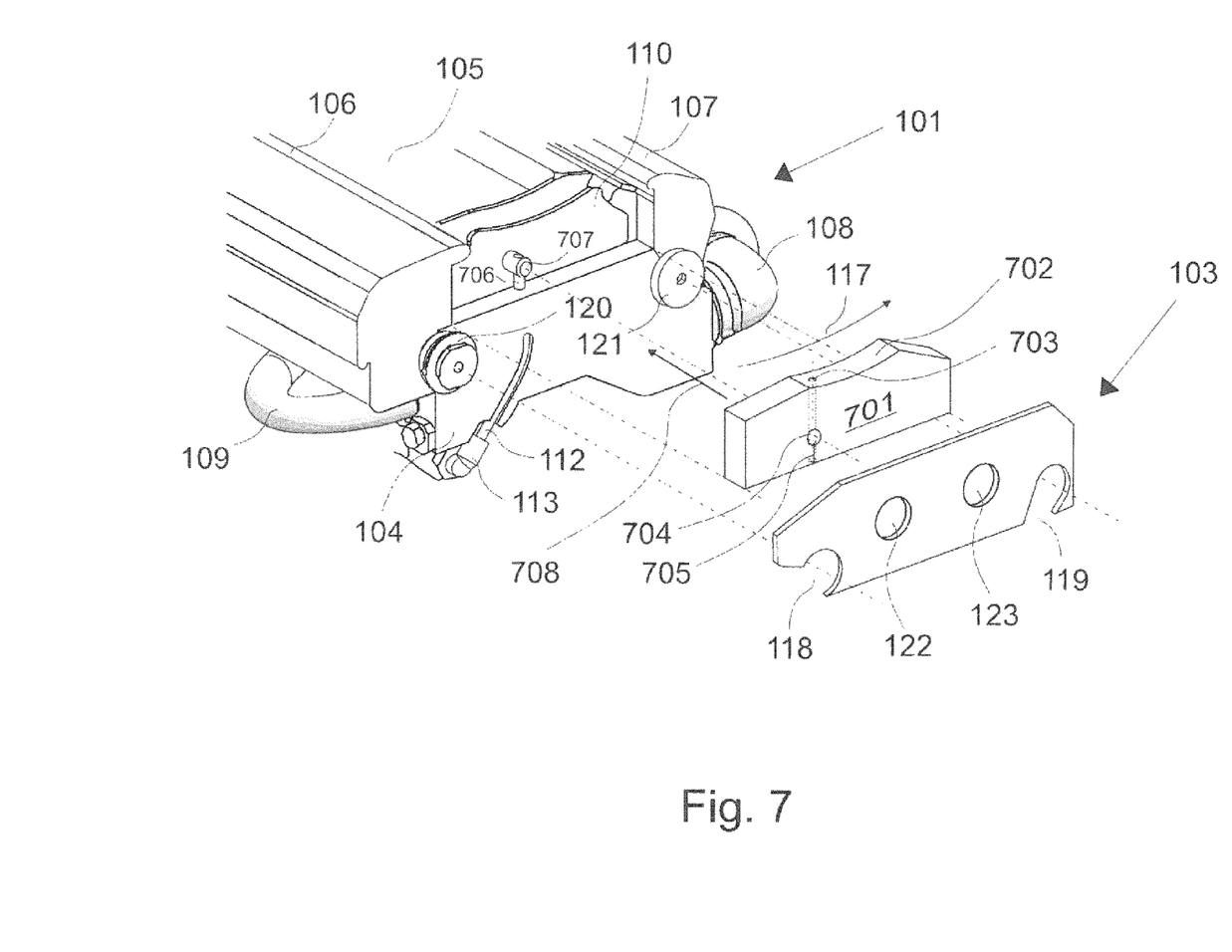
FIG. 7 shows a perspective view of the end face of a doctor blade chamber according to a seventh exemplary embodiment of the invention.

According to a seventh exemplary embodiment of the invention, FIG. 7 shows a perspective view of the end face of a doctor blade chamber. Relative to FIG. 1, like parts are assigned like reference numerals, so that in this respect reference may be made to the above description of FIG. 1. A decisive difference with respect to the first exemplary embodiment according to FIG. 1 and the seventh exemplary embodiment according to FIG. 7 is that the process of inserting the sealing element 701 into the fitting 110 is simplified.

To this end, the compressed air pin 111 of FIG. 1 is slightly longer and protrudes—as shown by the reference numeral 706—approximately centrally into the fitting 110. In addition, the compressed air pin 706 is fixated by a bolt 707.

Corresponding to the bolt 707, the sealing element 701 has a bore 704 in the direction of the arrow 708 and a slot 705, and the slot 705 also extends in the direction of the arrow 708 in the plane below the bore 704. In addition, the sealing element 701, like the sealing element 102 from FIG. 1, has a sealing surface 702 and a compressed air outlet opening 703, the compressed air outlet opening 703 continuing as a continuous bore in the manner shown within the sealing element 701.

Startup takes place analogously to the first exemplary embodiment shown in FIG. 1, wherein the insertion of the sealing element 701 into the 110 is simplified because the sealing element may be pressed directly in the direction of the arrow 708 against the bolt 707. In this case, the slot 705 ensures that the sealing element 701 opens slightly downwards and thus makes room for the compressed air pin 706. After the sealing element 701 has been pressed in this manner into its end position, the release of the compressed air pin 706 corresponds to the corresponding bore of the compressed air outlet opening 703, so that compressed air exits the compressed air outlet opening 703 as soon as the compressed air acts on the compressed air line 112.

Finally, to secure the sealing element 701, the end plate 103 is fastened in front of the sealing element 701. For this purpose, recesses 118, 119 are provided on the end plate 103, which correspond to the clamp plates 120, 121 fastened to bolts in such a way that the end plate 103 may engage behind the clamping disks 120, 121. Grip holes 122, 123 are provided for better handling of the end plate 103.

After the doctor blades have also been mounted, the doctor blade chamber 101 is engaged against the anilox roller of the flexographic printing press and the ink circulation is started up. At the same time the compressed air line 112 is pressurized with compressed air, for example, with a pressure of 4 bar. Via the compressed air pin 706, the compressed air passes through the bore within the sealing element 701 to the compressed air outlet opening 703 and exits therefrom at a pressure of about 1.8 bar. The thus released compressed air forms a flow film between the sealing surface 702 and the anilox roll surface, with which the above-described effects of the invention may be achieved. The compressed air outlet opening 703 may, for example, have a diameter of 0.5 mm, through which an air flow of 2 liters/minute passes during operation. In consequence, even small amounts of air are sufficient to achieve the effects of the invention.

The invention claimed is:

1. A sealing element for the frontal sealing of a doctor blade chamber of a flexographic printing press, the sealing element
    having a sealing surface that during operation rests against a roller body during operation of the flexographic printing press, the sealing surface having:
        an axial direction, defined by a rotational axis of the roller body,
        a radial direction, the radial direction being perpendicular to the axial direction,
        a first end and a second end, said first and second end defining the extremities of the sealing surface along the radial direction, and
        a center defined by a line across the sealing surface in the axial direction, said line being equidistant in the radial direction from each end of the sealing surface,
    having a base body configured to be deployed at the end faces of the doctor blade chamber in fittings furnished for the purpose, the base body including a bottom surface opposite the sealing surface, wherein the base body of the sealing element consists of an elastic material having a compression hardness causing the sealing surface to be biased relative to the roller body, and
    having a compressed air channel that extends from the bottom surface, through the base body,
    wherein compressed air is released from a flow outlet opening during operation of the flexographic printing press in such a way that the compressed air between the sealing surface and roller body forms a sealing flow film, said flow outlet opening being biased in the radial direction toward one of the first and second ends and not extending past the center.

2. The sealing element according to claim 1, wherein to reduce wear, the sealing surface is coated with a less compressible material of higher compression hardness relative to the base body.

3. The sealing element according to claim 2, wherein the compressed air is enriched with at least one additional fluid that propagates in the flow film and increases the sealing effect.

4. The sealing element according to claim 3, wherein an overpressure of the compressed air is provided by a pressure line to which a pressure gauge is connected, the measurements of which may be transmitted to a monitoring apparatus.

5. The sealing element according to claim 2, wherein an overpressure of the compressed air is provided by a pressure line to which a pressure gauge is connected, the measurements of which may be transmitted to a monitoring apparatus.

6. The sealing element according to claim 1, wherein the compressed air is enriched with at least one additional fluid that propagates in the flow film and increases the sealing effect.

7. The sealing element according to claim 6, wherein an overpressure of the compressed air is provided by a pressure line to which a pressure gauge is connected, the measurements of which may be transmitted to a monitoring apparatus.

8. The sealing element according to claim 1, wherein an overpressure of the compressed air is provided by a pressure line to which a pressure gauge is connected, the measurements of which may be transmitted to a monitoring apparatus.

9. A method for operating a flexographic printing press with a doctor blade chamber the end faces of which are respectively sealed by a sealing element resting on a roller body according to one of claims 1-4, the method comprising:
   using the sealing element at the end faces of the doctor blade chamber in fittings furnished for that purpose,
   making a connection between a compressed air outlet opening and a compressed air line, and
   forming an overpressure in the compressed air line such that the compressed air between the sealing surface and the roller body forms a sealing flow film.

\* \* \* \* \*